US010346161B2

(12) United States Patent
Mak et al.

(10) Patent No.: US 10,346,161 B2
(45) Date of Patent: *Jul. 9, 2019

(54) AUTOMATIC DETECTION OF POTENTIAL MERGE ERRORS

(71) Applicant: International Business Machines Corporation, Armonk, NY (US)

(72) Inventors: Howard Mak, Peakhurst (AU); Jacqueline A. Sheather, East Hills (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,275

(22) Filed: Apr. 27, 2018

(65) Prior Publication Data
US 2018/0246716 A1    Aug. 30, 2018

Related U.S. Application Data

(63) Continuation of application No. 15/004,147, filed on Jan. 22, 2016, now Pat. No. 9,996,342.

(51) Int. Cl.
G06F 8/71       (2018.01)
G06F 11/36      (2006.01)

(52) U.S. Cl.
CPC ............ G06F 8/71 (2013.01); G06F 11/3604 (2013.01); G06F 11/3616 (2013.01)

(58) Field of Classification Search
CPC ..... G06F 8/71; G06F 11/3604; G06F 11/3616
See application file for complete search history.

(56) References Cited

U.S. PATENT DOCUMENTS

| | | | |
|---|---|---|---|
| 8,458,650 B2* | 6/2013 | Andrade | G06F 11/3616 714/35 |
| 8,788,243 B2 | 7/2014 | Peterson et al. | |
| 8,881,112 B2 | 11/2014 | Corsetti et al. | |
| 8,910,117 B2* | 12/2014 | Li | G06F 8/71 717/120 |

(Continued)

OTHER PUBLICATIONS

Softens et al., "Detecting Conflicts on the Level of Changes", Preprint submitted to Benevol 2010—Proceedings of Short Papers, Dec. 3, 2010, 4 pages.

(Continued)

*Primary Examiner* — Ziaul A Chowdhury
(74) *Attorney, Agent, or Firm* — Christopher K. McLane

(57) ABSTRACT

In an approach to detection of potential merge errors when merging source code, a computer detects a source code merge process start. The computer compares at least one change made to a main stream of source code to a child stream. The computer determines whether one or more of the at least one change made to the main stream are not included in the child stream. Responsive to determining one or more of the at least one change made to the main stream are not included in the child stream, the computer determines the one or more of the at least one change made to the main stream that are not included in the child stream were removed from the child stream during a software development activity. The computer flags one or more files of the child stream corresponding to the one or more of the at least one change.

13 Claims, 4 Drawing Sheets

(56) References Cited

U.S. PATENT DOCUMENTS

| | | | |
|---|---|---|---|
| 9,021,441 B2 | 4/2015 | Yawalkar et al. | |
| 9,092,224 B2 | 7/2015 | Bartlow et al. | |
| 9,298,584 B2 | 3/2016 | Shehory | |
| 9,378,015 B2 | 6/2016 | Nagappan et al. | |
| 9,471,304 B1* | 10/2016 | Fuchs | G06F 8/71 |
| 9,684,507 B2 | 6/2017 | Mallisetty et al. | |
| 9,830,142 B2 | 11/2017 | Thomas et al. | |
| 9,830,227 B2* | 11/2017 | Letkeman | G06F 8/71 |
| 2004/0230886 A1 | 11/2004 | Livshits | |
| 2004/0230964 A1* | 11/2004 | Waugh | G06F 8/77 |
| | | | 717/168 |
| 2005/0262485 A1 | 11/2005 | Plante | |
| 2006/0123033 A1 | 6/2006 | Livshits | |
| 2006/0136904 A1 | 6/2006 | Weidman et al. | |
| 2006/0156282 A1 | 7/2006 | Mathew | |
| 2008/0244522 A1* | 10/2008 | Bernin | G06F 8/71 |
| | | | 717/122 |
| 2011/0113359 A1 | 5/2011 | Massey et al. | |
| 2012/0005667 A1 | 1/2012 | DeLuca et al. | |
| 2012/0110557 A1* | 5/2012 | Singh | G06F 8/75 |
| | | | 717/133 |
| 2012/0210294 A1* | 8/2012 | Gores | G06F 8/71 |
| | | | 717/105 |
| 2013/0036400 A1* | 2/2013 | Bak | G06F 8/71 |
| | | | 717/101 |
| 2014/0181789 A1* | 6/2014 | Canter | G06F 8/34 |
| | | | 717/113 |
| 2015/0106790 A1 | 4/2015 | Bigwood et al. | |
| 2015/0121334 A1* | 4/2015 | Bantupalli | G06Q 10/101 |
| | | | 717/103 |
| 2015/0220332 A1* | 8/2015 | Bernstein | G06F 8/71 |
| | | | 717/121 |
| 2016/0203071 A1* | 7/2016 | Cai | G06F 11/3616 |
| | | | 717/126 |
| 2016/0342720 A1* | 11/2016 | Veneris | G06F 17/5045 |
| 2017/0212751 A1 | 7/2017 | Mak et al. | |

OTHER PUBLICATIONS

Brun et al., "Proactive Detection of Collaboration Conflicts", ACM 2011, 11 pages.

Guimaraes et al., "Improving Early Detection of Software Merge Conflicts", IEEE 2012, 11 pages.

Dig et al., "Effective Software Merging in the Presence of Object-Oriented Refactorings", IEEE Transactions on Software Engineering, vol. 34, No. 3, May/Jun. 2008, 15 Pages.

* cited by examiner

AUTOMATIC DETECTION OF POTENTIAL MERGE ERRORS

BACKGROUND OF THE INVENTION

The present invention relates generally to the field of version control systems for software development, and more particularly to automatic detection of potential merge errors in source code.

Source code is any collection of computer instructions (possibly with comments) written using some human-readable computer language, often as text. The source code of a program is specially designed to facilitate the work of computer programmers, who specify the actions to be performed by a computer by writing source code. The source code is often transformed by a compiler program into low-level machine code understood by the computer. The machine code may then be stored for execution at a later time. Alternatively, an interpreter can be used to analyze and perform the outcomes of the source code program directly on the fly. The source code which constitutes a program is often held in one or more text files stored on a computer's hard disk; these files may be carefully arranged into a directory tree, known as a source tree. Source code can also be stored in a database (as is common for stored procedures) or elsewhere.

In the field of software development, revision control is a practice that tracks and provides control over changes to collections of information such as source code, documentation, or configuration files. Within software development projects, development teams often leverage features of revision control systems to practice various forms of branching. Branching is a mechanism for isolation and parallel development of software applications. A "branch" is a line of development of an application or system, which exists independent of another line of development, yet shares a common history. A branch may be a copy of some existing version, release, task, component, etc., of an application. A branch may be, for example, a new release, a new task, a new architectural component, a new version, or another differentiating aspect of an application. Certain branches are created with the intention of eventually merging somewhere at a future time.

A merge or integration is an operation in which two sets of changes are applied to a file or set of files. Merging two files can be a delicate operation, and may only be possible if the data structure is simple, as in text files. The result of a merge of two image files may not result in an image file at all. A second developer checking in code needs to take care with the merge, to make sure that the changes are compatible and that the merge operation does not introduce its own logic errors within the files. For example, a branch is created, the code in the files is independently edited, and the updated branch is later incorporated into a single, unified trunk.

SUMMARY

Embodiments of the present invention disclose a method, a computer program product, and a system for detection of potential merge errors when merging source code. The method may include one or more computer processors detecting a source code merge process start. The one or more computer processors compare at least one change made to a main stream of source code to a first child stream, where the first child stream is an incoming child stream of source code, and where the at least one change was made between a time corresponding to a branching of the first child stream and a time of the merge process start. The one or more computer processors determine whether one or more of the at least one change made to the main stream of source code are not included in the first child stream. In response to determining one or more of the at least one change made to the main stream of source code are not included in the first child stream, the one or more computer processors determine whether the one or more of the at least one change made to the main stream of source code that are not included in the first child stream were removed from the first child stream during a software development activity. In response to determining the one or more of the at least one change made to the main stream of source code that are not included in the first child stream were not removed from the first child stream during a software development activity, the one or more computer processors flag one or more files of the first child stream corresponding to the one or more of the at least one change.

DETAILED DESCRIPTION

Many source control or version control systems are based on the concept of streams. A main/trunk stream contains the base copy of the source code for the software being developed. Child streams are branched off the main stream for development in isolation, and are then merged back into the main stream when development is complete. On occasion, a file may be modified on both streams. This may require the developer to rebase the child stream, to get the latest changes from the main stream, and merge any files that were modified by both streams before the child stream is merged back into the main stream.

Embodiments of the present invention recognize that the risk of unintentional changes being introduced to the main source stream during a stream merge may be reduced by automatically detecting potential merge issues or errors during the merging of source code streams. Embodiments of the present invention also recognize that time and resources spent identifying and resolving unintentional code changes that are introduced to the main source stream by merge activities may be reduced by automatically detecting potential merge issues during the merging of source code streams. Implementation of embodiments of the invention may take a variety of forms, and exemplary implementation details are discussed subsequently with reference to the Figures.

Figure 1:
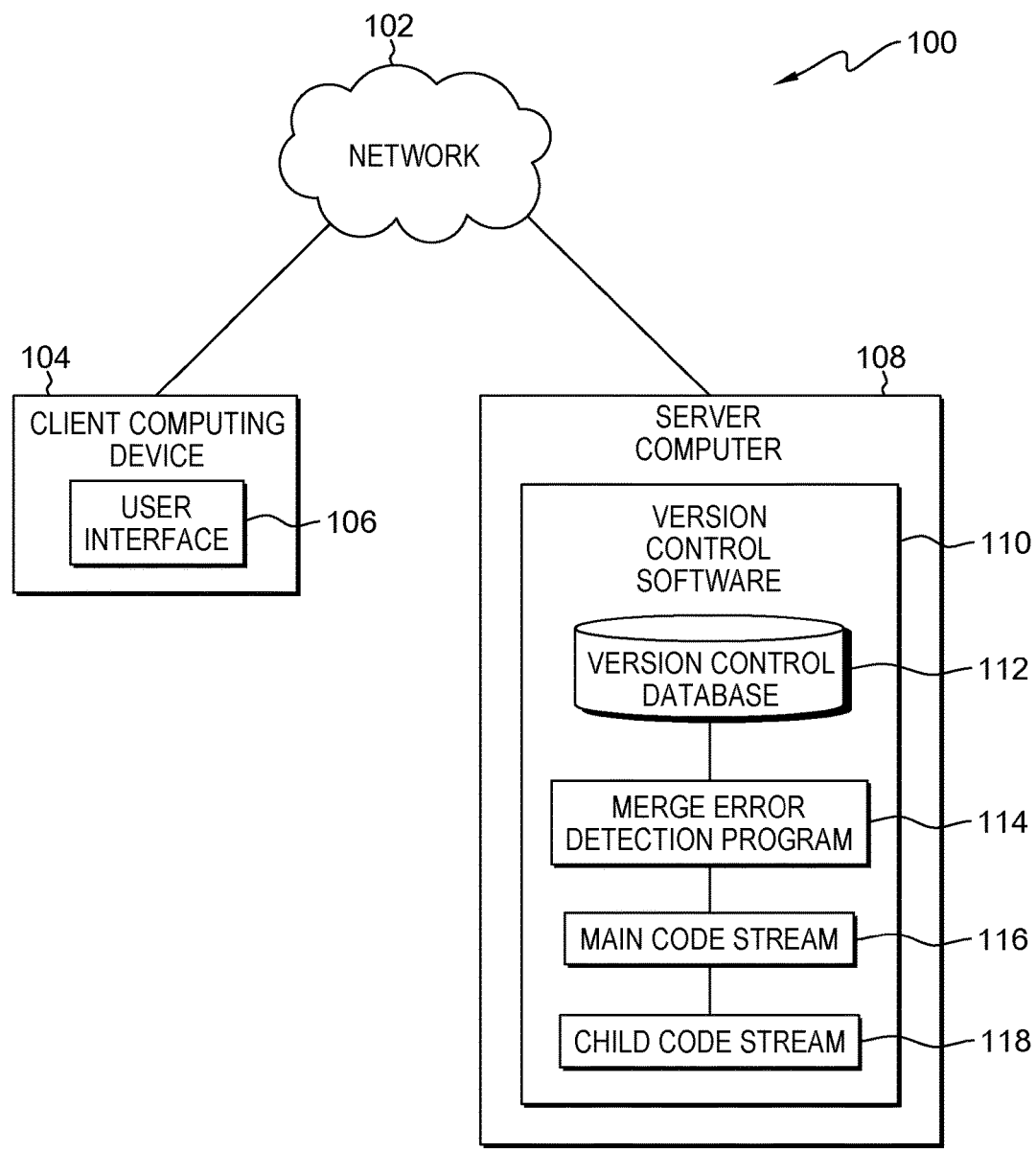
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. In general, client computing device 104 represents any programmable electronic device or combination of programmable electronic devices capable of executing machine readable program instructions and communicating with other computing devices (not shown) within distributed data processing environment 100 via a network, such as network 102. Client computing device 104 includes user interface 106.

User interface 106 provides an interface between a user of client computing device 104 and server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables a user of client computing device 104 to access server computer 108 for software development activities.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes version control software 110. Server computer 108 may include internal and external hardware components, as depicted and described in further detail with respect to FIG. 4.

Version control software 110 is one of a plurality of software programs designed to manage changes or revisions to documents, computer programs, large web sites, and other collections of information. Version control software 110 may provide features for tracking, managing, and/or implementing changes to source code files and for generating (or building) one or more versions of a product. As a component of a software configuration management package, version control software 110 generally identifies changes by a number or letter code, termed the "revision number," "revision level," or simply "revision." In computer software engineering, version control, or revision control, is any kind of practice that tracks and provides control over changes to source code. Version control software 110 may maintain one or more log files that list and describe each change to the base source code. A log file may detail each change by file name and line number. Software developers may use version control software 110 to maintain documentation and configuration files as well as source code. Version control software 110 includes version control database 112, merge error detection program 114, main code stream 116, and child code stream 118.

Version control database 112 is a repository for code changes managed by version control software 110. A database is an organized collection of data. Version control database 112 can be implemented with any type of storage device capable of storing data and configuration files that can be accessed and utilized by server computer 108, such as a database server, a hard disk drive, or a flash memory. Version control database 112 may store attributes associated with a code change such as the name of the developer that made the change, the date the change was made, the purpose of the change, and any detected errors associated with the change.

Merge error detection program 114 flags software development activities in a child stream at the time of delivery to the main stream which may have errors as a result of a merge of changes from the main stream to the child stream. In the depicted embodiment, merge error detection program 114 is integrated into version control software 110. In another embodiment, merge error detection program 114 may be a standalone program. As a standalone program, merge error detection program 114 can reside on server computer 108 or elsewhere in distributed data processing environment 100, provided that version control software 110 has access to merge error detection program 114. Merge error detection program 114 automatically detects potential merge issues during the merging of source code streams. In order to automatically detect potential merge errors, as a merge process begins, merge error detection program 114 compares change sets for files in the main stream to the incoming child stream, starting from the point in time when the child stream was branched off or since the child stream was last successfully merged with the main stream. If any changes in the main stream are not included in the child stream, then merge error detection program 114 determines whether missing changes were removed intentionally. If merge error detection program 114 determines the changes were not removed intentionally, then merge error detection program 114 determines whether there are any un-reviewed activities in the child stream that contain the file with the missing changes. If there are un-reviewed activities, then merge error detection program 114 flags the file and/or activities associated with the changes such that a software developer can review the changes, rectify any errors, and manually re-start the merge process. Merge error detection program 114 is depicted and described in further detail with respect to FIG. 3.

Main code stream 116 is an example of source code which a user of client computing device 104 is changing. Main code stream 116 may be referred to as a "trunk" of the source code. Source code is any collection of computer instructions written using some human-readable computer language. The source code of a program is specially designed to facilitate the work of computer programmers, who specify the actions to be performed by a computer by writing source code. The source code is often transformed by a compiler program into low-level machine code understood by the computer. Child code stream 118 is a branch of main code stream 116. In an embodiment, child code stream 118 may be one or more of a plurality of child code streams. A "branch" is a line of development of an application or system, which exists independent of another line of development, yet shares a common history. Child code stream 118 begins as a copy of main code stream 116. Child code stream 118 may be, for example, a new release, a new task, a new architectural component, a new version, or another differentiating aspect of main code stream 116. In one embodiment, main code stream 116 and child code stream 118 reside in version control database 112.

Figure 2:
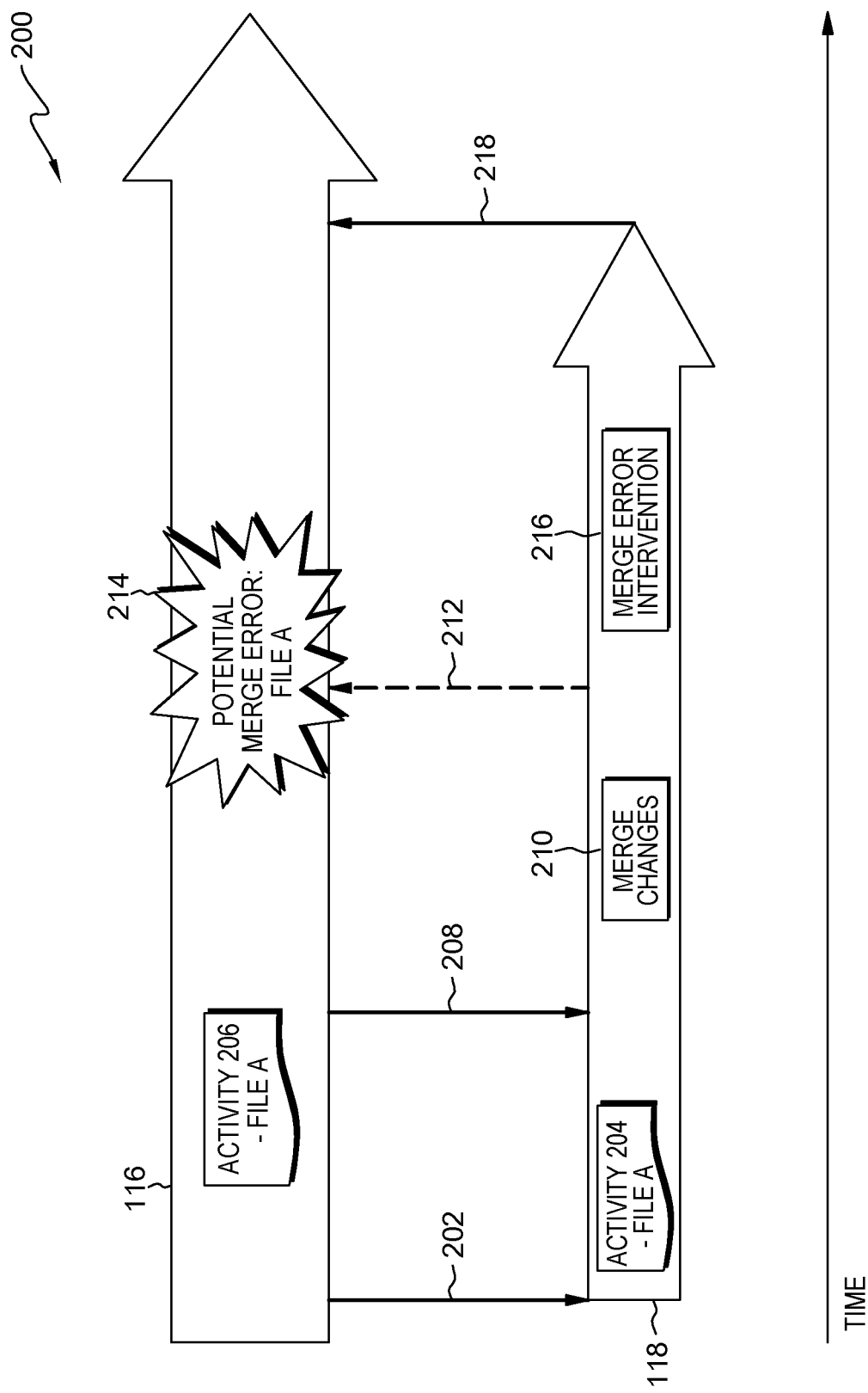
FIG. 2 is a flow diagram illustrating version control activities during a software development project, in accordance with an embodiment of the present invention.

FIG. 2 is flow diagram 200 illustrating version control activities during a software development project, in accordance with an embodiment of the present invention. Main code stream 116, as discussed with respect to FIG. 1, is represented by the large arrow going from left to right, and is depicted with events that occur through time. Child code stream 118, as discussed with respect to FIG. 1, is represented by the smaller arrow going from left to right, and is depicted with events that occur through time. Event 202 is the point in time where child code stream 118 is branched off of main code stream 116. At the time that child code stream 118 is branched off of main code stream 116, the two code streams are identical.

Shortly after event 202, software development activity 204 begins in child code stream 118, where a software developer is making changes to File A. Sometime later, software development activity 206 begins in main code stream 116, where a software developer is also making changes to File A. Periodically during the development of child code stream 118, version control software 110 performs a rebase operation to sync changes that have been made to main code stream 116 with child code stream 118. The rebase operation may be automatic, or it may be triggered by a software developer working on child code stream 118. Just before merging child code stream 118 back into main code stream 116, version control software 110 causes rebase 208 to occur. During rebase 208, child code stream 118 pulls in any changes that have been made to main code stream 116 since child code stream 118 branched off or since child code stream 118 was last successfully merged with main code stream 116. Rebase 208 may occur automatically, or version control software 110 may prompt a user to trigger rebase 208. Next, as merge changes 210 begins, modifications made to File A in software development activity 206 are merged into File A in child code stream 118. Merge changes 210 may be done manually, by a software developer, or automatically, by version control software 110. In the example, changes to File A from software development activity 206 are unintentionally removed during merge changes 210.

Version control software 110 attempts a stream merge at event 212 to merge child code stream 118 into main code stream 116. Merge error detection program 114 detects the start of a merge process and compares the change sets in main code stream 116 to child code stream 118 since child code stream 118 branched off or since child code stream 118 was last successfully merged with main code stream 116. Merge error detection program 114 determines that changes to File A in main code stream 116 from software development activity 206 are missing in child code stream 118.

In a first example, merge error detection program 114 determines that the changes were not intentionally removed from File A in child code stream 118 because the deletion of the changes was not part of software development activity 204 or any other non-merge activity on child code stream 118 since child code stream 118 branched off or since child code stream 118 was last successfully merged with main code stream 116. Since the missing changes were not intentionally removed from child code stream 118, merge error detection program 114 detects a merge error. Merge error detection program 114 creates flag 214 to indicate that there is a potential merge error in File A. In one embodiment, if more than one software development activity in child code stream 118 modified File A, then merge error detection program 114 flags File A and all software development activities in child code stream 118 that modified File A. Merge error detection program 114 also flags software development activity 204 because software development activity 204 contains changes made to File A. Because merge error detection program 114 detected a potential merge error, merge error detection program 114 cancels the merge of child code stream 118 to main code stream 116, and none of the changes from child code stream 118 are delivered, regardless of their merge error status. Merge error detection program 114 notifies a software developer of the potential merge error. The software developer reviews the flagged file and rectifies the error in merge error intervention 216. Once the software developer clears the flag on File A, merge error detection program 114 also removes the flag on software development activity 204 since there are no other files contained within software development activity 204 that have been flagged. Furthermore, merge error detection program 114 marks software development activity 204 as reviewed, such that merge error detection program 114 will not re-detect the same activity on subsequent merge attempts. Once the software developer completes the review of flagged files and activities, the software developer re-attempts the merge of child code stream 118 into main code stream 116. Since the software developer rectified the missing changes during merge error intervention 216, child code stream 118 passes the checks of merge error detection program 114, and version control software 110 completes the stream merge in event 218.

In a second example, the user that triggers rebase 208 intentionally removes changes to File A from software development activity 206 during merge changes 210. The process proceeds as described with respect to the first example, with merge error detection program 114 creating flag 214 for File A and software development activity 204, and notifying a software developer of the potential merge error. At merge error intervention 216, the software developer reviews the flags and determines that the changes were intentionally removed from File A in child code stream 118 during merge changes 210. The software developer clears the flag on File A without making any modifications. Merge error detection program 114 removes the flag on software development activity 204 since there are no other files contained within software development activity 204 that have been flagged. Again, merge error detection program 114 marks software development activity 204 as reviewed, such that merge error detection program 114 will not re-detect the same activity on subsequent merge attempts. Once there are no flagged files or activities remaining for review, version control software 110 can re-attempt the stream merge in event 218.

When version control software 110 re-attempts the merge of child code stream 118 into main code stream 116 in event 218, merge error detection program 114 again determines that changes to File A in main code stream 116 from activity 206 are missing in child code stream 118. Merge error detection program 114 further determines that the changes were not intentionally removed from child code stream 118 because the deletion of the changes was not part of activity 204 or any other non-merge activity on child code stream 118. Merge error detection program 114 then checks whether File A has any associated activities that have not been previously marked as reviewed. Since activity 204 was marked as reviewed during merge error intervention 216, merge error detection program 114 determines there are no other activities on child code stream 118 containing File A that have not been reviewed. Therefore merge error detection program 114 determines that the missing changes have been previously reviewed and cleared. Since there are no additional missing changes requiring review, merge error detection program 114 triggers version control software 110 to complete the stream merge in event 218.

Figure 3:
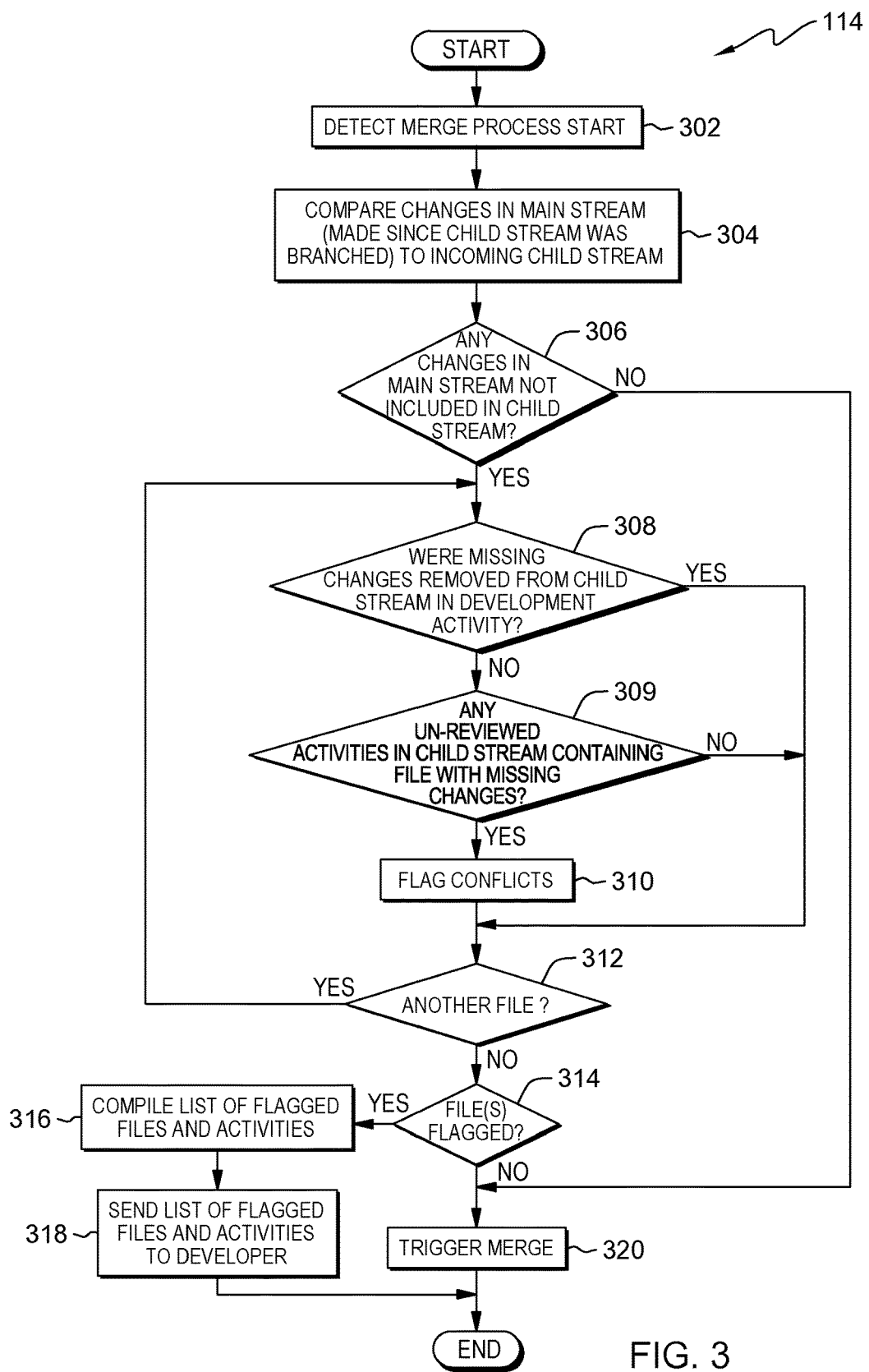
FIG. 3 is a flowchart depicting operational steps of a merge error detection program, on a server computer within the distributed data processing environment of FIG. 1, for detection of source code merge issues, in accordance with an embodiment of the present invention.

FIG. 3 is a flowchart depicting operational steps of merge error detection program 114, on server computer 108 within distributed data processing environment 100 of FIG. 1, for detection of source code merge issues, in accordance with an embodiment of the present invention.

Merge error detection program 114 detects a merge process start (step 302). As version control software 110 begins, either automatically or as a result of a prompt or trigger from a software developer, to merge child code stream 118 into main code stream 116, merge error detection program 114 detects the beginning of a merge process. In one embodiment, merge error detection program 114 may also detect version control software 110 performing a rebase operation on the child stream just before or as part of the beginning of the merge process, as discussed with respect to FIG. 2. In another embodiment, merge error detection program 114 can trigger a rebase operation prior to step 302.

Merge error detection program 114 compares changes in main code stream 116 that were made since the time child code stream 118 branched off, or since child code stream 118 was last successfully merged with main code stream 116, to incoming child code stream 118 (step 304). At the time child code stream 118 branches off from main code stream 116, the two code streams are identical. Once child code stream 118 branches off, software developers update each stream with one or more changes. One or more rebase operations may be performed between the time of the branch and the time of the merge in order to sync the two code streams, but errors can be made. At the time when child code stream 118 is to be merged into main code stream 116, merge error detection program 114 compares change sets for files of each software development activity that has been made to main code stream 116, since the time that child code stream 118 was branched off or since child code stream 118 was last successfully merged with main code stream 116, to the corresponding files of each software development activity in child code stream 118 to confirm that none of the changes to main code stream 116 have been inadvertently removed from child code stream 118. In one embodiment, merge error detection program 114 compares all files changed in main code stream 116 to the corresponding files in child code stream 118. In another embodiment, merge error detection program 114 may compare files selected by a user of client computing device 104, via user interface 106. In yet another embodiment, merge error detection program 114 may compare files with changes made within a specified period of time, for example, changes made within the last ten days. In a further embodiment, merge error detection program 114 may compare files changed by a specific user.

Merge error detection program 114 determines whether any changes made to main code stream 116 are not included in child code stream 118 (decision block 306). After comparing the changes made to main code stream 116 to child code stream 118, merge error detection program 114 determines whether any of the previous changes are missing from one or more files in one or more software development activities within child code stream 118. If merge error detection program 114 determines that changes made to main code stream 116 are not included in child code stream 118 ("yes" branch, decision block 306), then merge error detection program 114 determines whether the missing changes were removed from child code stream 118 in a software development activity (decision block 308).

If merge error detection program 114 determines the missing changes were not removed from child code stream 118 in a software development activity since child code stream 118 branched off or since child code stream 118 was last successfully merged with main code stream 116 ("no" branch, decision block 308), then merge error detection program 114 determines whether there are any un-reviewed activities in the child stream that contain a file with the missing changes (decision block 309). Merge error detection program 114 considers activities as "un-reviewed" prior to the first merge attempt. In addition, merge error detection program 114 considers activities that were not delivered during a previous merge attempt and were not flagged with potential conflicts as "un-reviewed." When merge error detection program 114 reaches decision block 309 during a merge re-attempt, merge error detection program 114 considers previously reviewed activities as "reviewed."

If merge error detection program 114 determines there are un-reviewed software development activities in the child stream that contain a file with the missing changes ("yes" branch, decision block 309), then merge error detection program 114 flags the conflicts (step 310). If the missing changes were not modified or removed in a software development activity within child code stream 118 since child code stream 118 branched off or since child code stream 118 was last successfully merged with main code stream 116, and the software development activity is un-reviewed, then merge error detection program 114 determines the changes may have been removed unintentionally or inadvertently during a previous merge process. Merge error detection program 114 flags the corresponding one or more files and the one or more software development activities associated with the flagged files in child code stream 118 for later review by a software developer. If multiple software activities in child code stream 118 include the flagged file, then merge error detection program 114 flags each activity that includes the flagged file.

Responsive to flagging the conflicts, or responsive to determining the missing changes were removed from child code stream 118 in a software development activity ("yes" branch, decision block 308), or responsive to determining there are no un-reviewed activities in the child stream that contain a file with the missing changes ("no" branch, decision block 309), merge error detection program 114 determines whether there is another file for comparison (decision block 312). If the missing changes were modified or removed in a software development activity within child code stream 118, then merge error detection program 114 determines the changes were removed intentionally, and merge error detection program 114 proceeds to determine whether another file or associated software development activity within main code stream 116 needs to be checked for missing changes. In one embodiment, merge error detection program 114 may review all the files within a particular activity. Once merge error detection program 114 completes a review of all files within an activity, merge error detection program 114 may proceed to review files within another activity.

If merge error detection program 114 determines there is another file for comparison ("yes" branch, decision block 312), then merge error detection program 114 returns to step 308. If merge error detection program 114 determines there is not another file or software development activity for comparison ("no" branch, decision block 312), then merge error detection program 114 determines whether one or more files and associated activities have been flagged (decision block 314). Once merge error detection program 114 has compared all the changed files and software development activities from main code stream 116 to child code stream 118, merge error detection program 114 reviews the results of step 310 to determine whether merge error detection program 114 flagged any of the comparisons.

If merge error detection program 114 determines one or more files and associated activities have been flagged ("yes" branch, decision block 314), then merge error detection program 114 compiles a list of flagged files and software development activities (step 316). Merge error detection program 114 compiles a list of all files and software development activities of child code stream 118 that are missing changes that were made to corresponding files of main code stream 116. In addition, merge error detection program 114 may list one or more merge activities that contain flagged files.

Merge error detection program 114 sends the list of flagged files and software development activities to a software developer (step 318). In one embodiment, merge error detection program 114 may prevent re-attempts to merge child code stream 118 into main code stream 116 until action is taken to remove the flags. In order to alert a software developer to potential merge errors, merge error detection program 114 may send the list of flagged files and software development activities to the software developer, via user interface 106, such that the software developer can review the list and either rectify merge errors or determine the changes were intentional during a previous merge. Once an error is either rectified or determined to be intentional, the software developer removes the flag and marks the file and associated software development activities as reviewed, such that the merge process can be re-attempted. In one embodiment, the software developer may mark an activity as reviewed by manually setting a "reviewed" property in version control software 110. Merge error detection program 114 considers activities included in a failed merge attempt containing no flagged errors as "un-reviewed" on subsequent merge attempts. Activities that have been reviewed retain the reviewed status even if the merge re-attempt fails. Version control software 110 may re-attempt to merge child code stream 118 into main code stream 116 once no software development activities are flagged. If version control software 110 re-attempts to merge child code stream 118 into main code stream 116 with flags remaining, then merge error detection program 114 will re-detect the same conflicts. In one embodiment, the software developer notifies version control software 110 that the flags have been removed via user interface 106.

Responsive to determining there are no changes made to main code stream 116 that are not included in child code stream 118 ("no" branch, decision block 306), or responsive to determining no files have been flagged ("no" branch, decision block 314), merge error detection program 114 triggers the merge (step 320). If merge error detection program 114 does not detect any potential merge errors, then merge error detection program 114 triggers version control software 110 to proceed with merging child code stream 118 into main code stream 116.

In one embodiment, if merge error detection program 114 had previously compared main code stream 116 to child code stream 118, then merge error detection program 114 may perform an additional step prior to step 304 in which merge error detection program 114 determines whether files or activities that had been flagged during a previous comparison have been cleared of the flags or if the files remain flagged. If merge error detection program 114 determines that previous flags have not been cleared, then merge error detection program 114 may stop the merge process and notify a software developer, via user interface 106, to clear previous flags in order to proceed with the merge process. If merge error detection program 114 determines that previous flags have been cleared, then merge error detection program 114 may continue with step 304.

Figure 4:
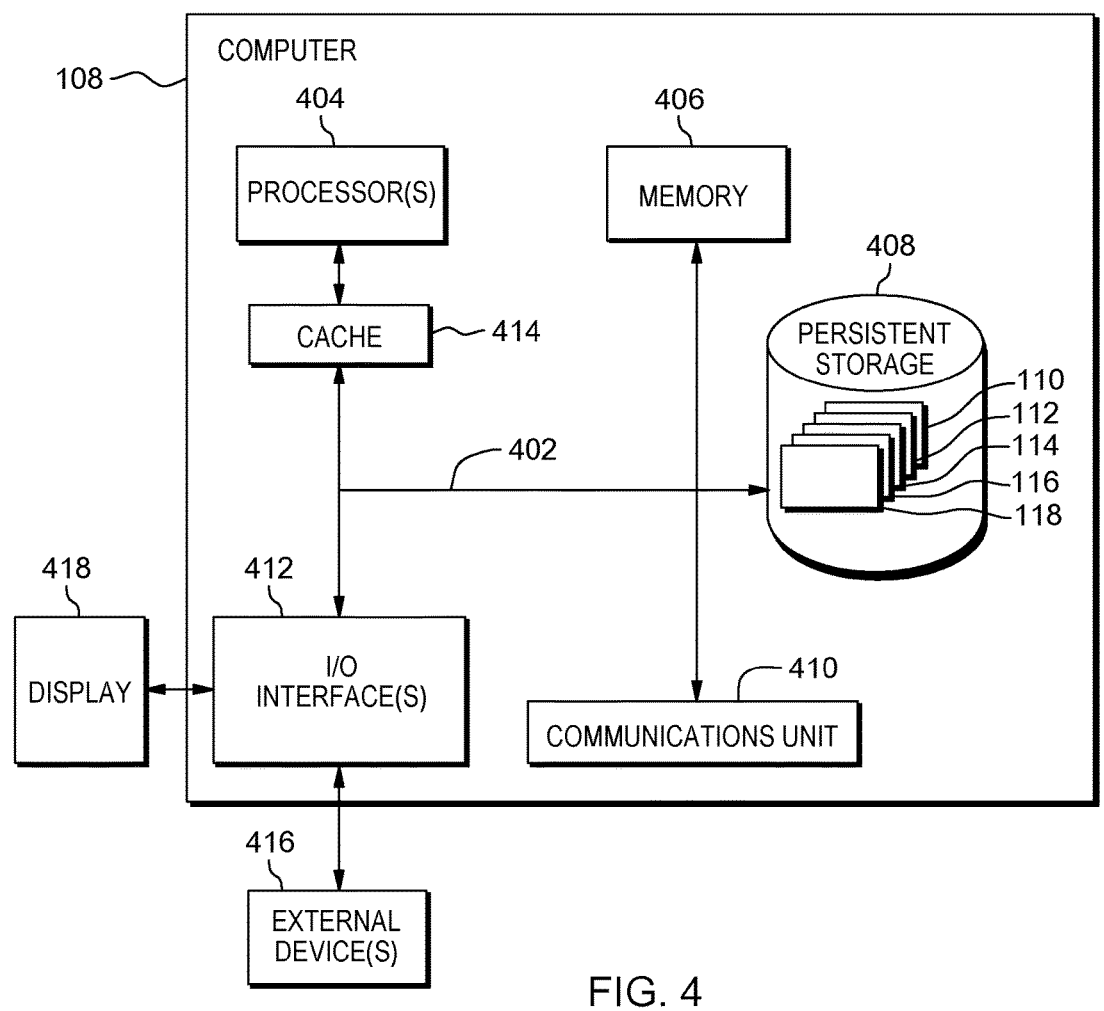
FIG. 4 depicts a block diagram of components of the server computer executing the merge error detection program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., version control software 110, version control database 112, merge error detection program 114, main code stream 116, and child code stream 118 can be stored in persistent storage 408 for execution and/or access by one or more of the respective processor(s) 404 of server computer 108 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Version control software 110, version control database 112, merge error detection program 114, main code stream 116, and child code stream 118 may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., version control software 110, version control database 112, merge error detection program 114, main code stream 116, and child code stream 118 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for detection of potential merge errors when merging source code, the method comprising:
   detecting, by one or more computer processors, a source code merge process start;
   determining, by the one or more computer processors, whether one or more of at least one change made to a main stream of source code were previously compared to a first child stream, wherein the first child stream is an incoming child stream of source code;
   responsive to determining the one or more of the at least one change made to the main stream of source code were previously compared to the first child stream, determining, by the one or more computer processors, whether one or more files of the first child stream corresponding to the one or more of the at least one change were flagged during the previous comparison;
   responsive to determining one or more files of the first child stream corresponding to the one or more of the at least one change were flagged during the previous comparison, determining, by the one or more computer processors, whether the one or more files remain flagged;
   responsive to determining the one or more files do not remain flagged, comparing, by the one or more computer processors, the at least one change made to the main stream of source code to the first child stream, and wherein the at least one change was made between a time corresponding to a branching of the first child stream and a time of the merge process start;
   determining, by the one or more computer processors, whether one or more of the at least one change made to the main stream of source code are not included in the first child stream;
   responsive to determining one or more of the at least one change made to the main stream of source code are not included in the first child stream, determining, by the one or more computer processors, whether the one or more of the at least one change made to the main stream of source code that are not included in the first child stream were removed from the first child stream during a software development activity; and
   responsive to determining the one or more of the at least one change made to the main stream of source code that are not included in the first child stream were not removed from the first child stream during a software development activity, flagging, by the one or more computer processors, one or more files of the first child stream corresponding to the one or more of the at least one change.

2. The method of claim 1, further comprising:
   responsive to flagging one or more files of the first child stream corresponding to the one or more of the at least one change, compiling, by the one or more computer processors, a list of the one or more flagged files; and
   sending, by the one or more computer processors, the list to a user.

3. The method of claim 1, wherein flagging one or more files of the first child stream corresponding to the one or more of the at least one change further comprises flagging, by the one or more computer processors, at least one of: a change, a file corresponding to a change, or a software development activity corresponding to a change.

4. The method of claim 1, further comprising, responsive to determining the one or more of the at least one change made to the main stream of source code that are not included in the first child stream were removed from the first child stream during a software development activity, triggering, by the one or more computer processors, a merge process.

5. The method of claim 1, further comprising, responsive to determining one or more of the at least one change made to the main stream of source code are included in the first child stream, triggering, by the one or more computer processors, a merge process.

6. The method of claim 1, further comprising, prior to detecting the source code merge process start, triggering, by the one or more computer processors, a rebase operation on the first child stream.

7. The method of claim 1, further comprising:
responsive to determining the one or more of the at least one change made to the main stream of source code that are not included in the first child stream were not removed from the first child stream during a software development activity, determining, by the one or more computer processors, whether one or more software development activities in the first child stream containing a file that does not include the at least one change made to the main stream of source code has been reviewed; and
responsive to determining one or more software development activities in the first child stream containing a file that does not include the at least one change made to the main stream of source code has not been reviewed, flagging, by the one or more computer processors, one or more files of the first child stream corresponding to the one or more at least one change.

8. A computer program product for detection of potential merge errors when merging source code, the computer program product comprising:
one or more computer readable storage devices and program instructions stored on the one or more computer readable storage devices, the stored program instructions comprising:
program instructions to detect a source code merge process start;
program instructions to determine whether one or more of at least one change made to a main stream of source code were previously compared to a first child stream, wherein the first child stream is an incoming child stream of source code;
responsive to determining the one or more of the at least one change made to the main stream of source code were previously compared to the first child stream, program instructions to determine whether one or more files of the first child stream corresponding to the one or more of the at least one change were flagged during the previous comparison;
responsive to determining one or more files of the first child stream corresponding to the one or more of the at least one change were flagged during the previous comparison, program instructions to determine whether the one or more files remain flagged;
responsive to determining the one or more files do not remain flagged, program instructions to compare at least one change made to a main stream of source code to a first child stream, wherein the first child stream is an incoming child stream of source code, and wherein the at least one change was made between a time corresponding to a branching of the first child stream and a time of the merge process start;
program instructions to determine whether one or more of the at least one change made to the main stream of source code are not included in the first child stream;
responsive to determining one or more of the at least one change made to the main stream of source code are not included in the first child stream, program instructions to determine whether the one or more of the at least one change made to the main stream of source code that are not included in the first child stream were removed from the first child stream during a software development activity; and
responsive to determining the one or more of the at least one change made to the main stream of source code that are not included in the first child stream were not removed from the first child stream during a software development activity, program instructions to flag one or more files of the first child stream corresponding to the one or more of the at least one change.

9. The computer program product of claim 8, the stored program instructions further comprising:
responsive to flagging one or more files of the first child stream corresponding to the one or more of the at least one change, program instructions to compile a list of the one or more flagged files; and
program instructions to send the list to a user.

10. The computer program product of claim 8, the stored program instructions further comprising, responsive to determining the one or more of the at least one change made to the main stream of source code that are not included in the first child stream were removed from the first child stream during a software development activity, program instructions to trigger a merge process.

11. The computer program product of claim 8, the stored program instructions further comprising, responsive to determining one or more of the at least one change made to the main stream of source code are included in the first child stream, program instructions to trigger a merge process.

12. The computer program product of claim 8, the stored program instructions further comprising:
responsive to determining the one or more of the at least one change made to the main stream of source code that are not included in the first child stream were not removed from the first child stream during a software development activity, program instructions to determine whether one or more software development activities in the first child stream containing a file that does not include the at least one change made to the main stream of source code has been reviewed; and
responsive to determining one or more software development activities in the first child stream containing a file that does not include the at least one change made to the main stream of source code has not been reviewed, program instructions to flag one or more files of the first child stream corresponding to the one or more at least one change.

13. The computer program product of claim 8, the stored program instructions further comprising:
responsive to detecting a source code merge process start, program instructions to determine whether one or more of the at least one change made to the main stream of source code were previously compared to the first child stream;
responsive to determining the one or more of the at least one change made to the main stream of source code were previously compared to the first child stream, program instructions to determine whether one or more files of the first child stream corresponding to the one or more of the at least one change were flagged during a previous comparison;

responsive to determining one or more files of the first child stream corresponding to the one or more of the at least one change were flagged during the previous comparison, program instructions to determine whether the one or more files remain flagged; and responsive to determining the one or more files remain flagged, program instructions to notify a user.

* * * * *